US007523226B2

(12) United States Patent
Anderson et al.

(10) Patent No.: US 7,523,226 B2
(45) Date of Patent: Apr. 21, 2009

(54) CONTROLLING AN AUXILIARY DISPLAY USER INTERFACE BASED ON USAGE CONTEXT

(75) Inventors: Jason M. Anderson, Snoqualmie, WA (US); Andrew Fuller, Redmond, WA (US); Daniel Makoski, Redmond, WA (US); William J. Westerinen, Sammamish, WA (US); Matthew P. Rhoten, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 11/371,660

(22) Filed: Mar. 9, 2006

(65) Prior Publication Data

US 2007/0130399 A1 Jun. 7, 2007

Related U.S. Application Data

(60) Provisional application No. 60/734,852, filed on Nov. 9, 2005.

(51) Int. Cl.
*G06F 3/00* (2006.01)

(52) U.S. Cl. ..................... 710/15; 710/3; 710/4; 710/5; 710/8; 710/11; 710/16; 710/33

(58) Field of Classification Search ..................... 710/3, 710/4, 5, 8, 11, 15, 16, 33
See application file for complete search history.

(56) References Cited

U.S. PATENT DOCUMENTS

| | | | | |
|---|---|---|---|---|
| 2004/0204964 | A1 * | 10/2004 | Moore et al. | 705/2 |
| 2005/0216606 | A1 * | 9/2005 | Hayes et al. | 710/5 |
| 2007/0271400 | A1 * | 11/2007 | Lemke et al. | 710/8 |

OTHER PUBLICATIONS

Chris Tacke, "*Introduction to Programming for the TinyCLR*," May 10, 2005.

* cited by examiner

*Primary Examiner*—Niketa I Patel
*Assistant Examiner*—Jasjit S Vidwan
(74) *Attorney, Agent, or Firm*—Marshall, Gerstein & Borun LLP

(57) ABSTRACT

An auxiliary computing device normally used for remotely controlling a primary device may change its functionality and extend its usefulness based on a usage context. An auxiliary device may change its usage context by connecting differently to a primary device depending on any number of parameters including distance from the device, battery life, connection method, and proximity to other devices. The device may change its usage context by interfacing with a primary device service that communicates with various applications to feed the auxiliary device different information in different usage contexts. Further, the device may control different functions of the primary device based on the usage context.

19 Claims, 19 Drawing Sheets

CONTROLLING AN AUXILIARY DISPLAY USER INTERFACE BASED ON USAGE CONTEXT

RELATED DOCUMENTS

The present application claims the benefit of U.S. Provisional Patent Application No. 60/734,852 filed on Nov. 9, 2005, the entire disclosure of which is hereby incorporated by reference.

BACKGROUND

As the Personal Computer (PC) platform continues to evolve to support rich entertainment scenarios, auxiliary devices 200 are becoming more commonplace to remotely control PCs and other devices without traditional control buttons, keyboards or other physical input devices. Additionally, these auxiliary devices 200 are beginning to include rich auxiliary displays 210 which allow the user to browse content without disrupting the entertainment experience on the primary display 191. However, when seated in front of the primary computing device, a user's direct interaction with control buttons, the main display, keyboard, and mouse greatly diminishes the auxiliary device's 200 usefulness. By placing the device 200 into a nearby charging dock 322, the device 200 can be situated such that its display 210 remains useful to the user. When docked, the device 200 will change its function to act as a primary display's companion through an operating system service such as the Windows SideShow technology in the Windows Vista operating system.

SUMMARY

An auxiliary computing device normally used for remotely controlling a primary device may change its functionality and extend its usefulness based on a usage context. An auxiliary device may change its usage context by connecting differently to a primary device depending on any number of parameters including distance from the device, battery life, connection method, and proximity to other devices. For example, while the device is very near the primary device, it may not be useful as a traditional remote control. When close, the device may connect differently to the primary device to change its usage context and display information broadcast from the primary device. The device may change its usage context by interfacing with a primary device service that communicates with various applications to feed the auxiliary device different information in different usage contexts. Further, the device may control different functions of the primary device based on the usage context.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
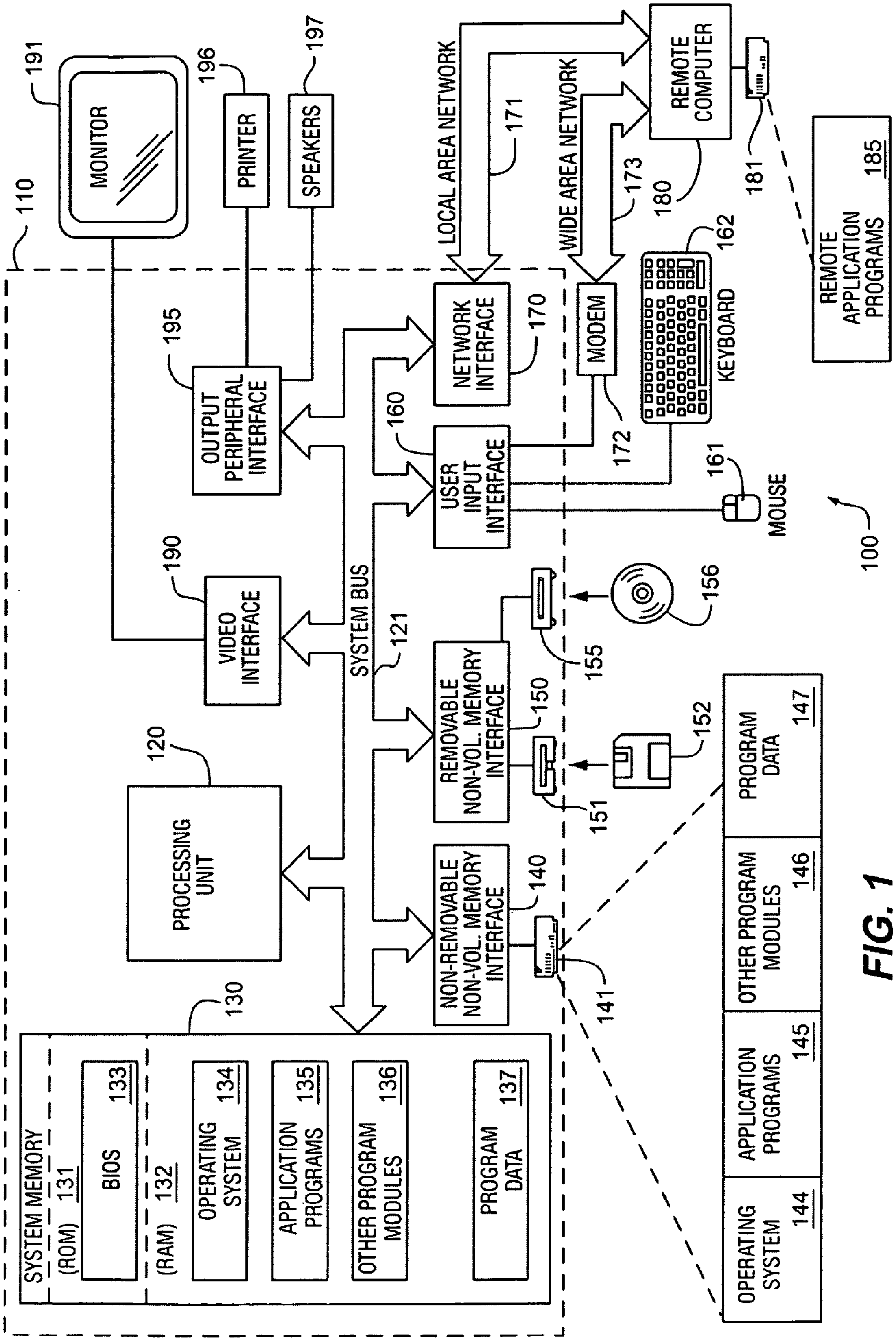
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc., that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect Express (PCI-E) bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typic modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
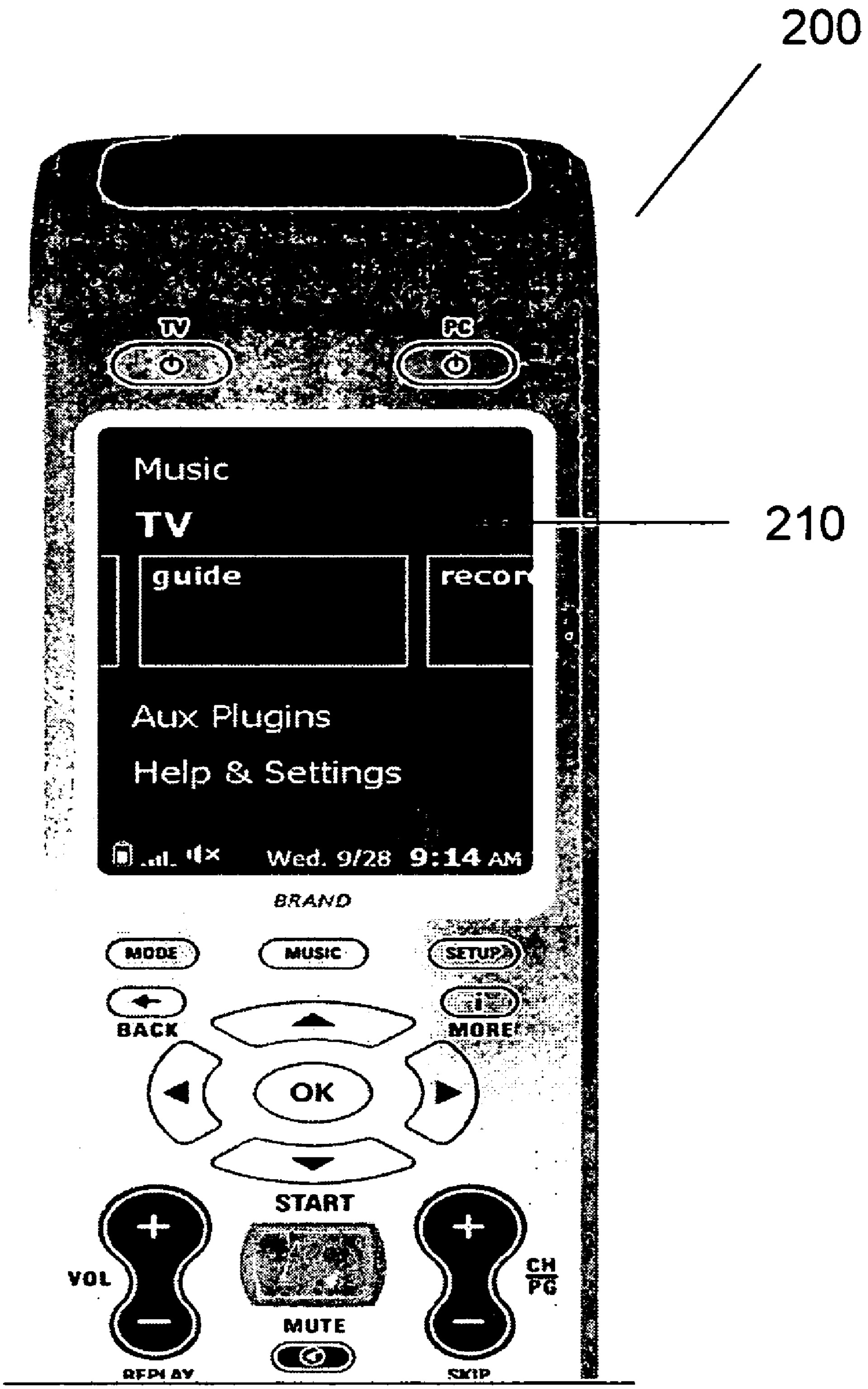
FIG. 2 is an auxiliary computing device in the form of a remote control.
Figure 3:
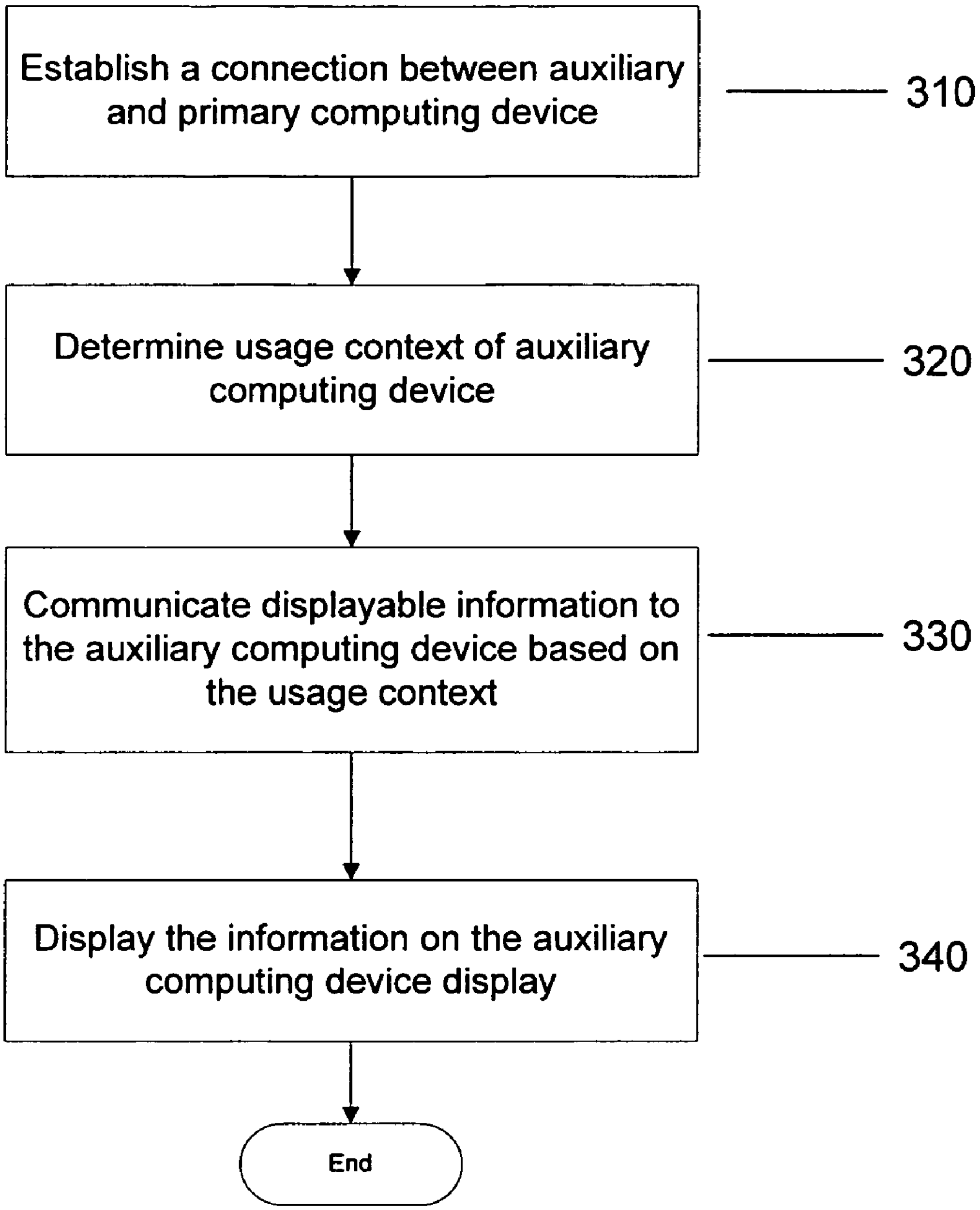
FIG. 3 is a flowchart of a control process for an auxiliary computing device based on usage context.

Generally, and with reference to FIGS. 2 and 3, the following is a method of controlling the flow of information between two computing devices based on the changing usage context of each device. The term 'remote control' or 'auxiliary computing device' 200 may be any computing device that may perform an operation or function or obtain data directly from or through another local or remote computing device. Without limitation, devices capable of functioning as a remote control or an auxiliary computing device 200 may include traditional media device remote controls, hand held computers, cellular phones, and SmartPhone-enabled devices.

At block 310, an auxiliary computing device 200, may establish a connection between the auxiliary computing device 200 and a primary computing device. This connection may be by a direct, wired connection through an external peripheral interface such as the Universal Serial Bus (USB) standard, a wireless USB, a wired LAN, a wireless connection through a wireless LAN using a wireless fidelity (WiFi) connection, an open standard, short-range connectivity technology such as Bluetooth, an Ultra-Wide Band connection (UWB), or a published specification set of high level communication protocols designed to use small, low power digital radios based on the IEEE 802.15.4 standard for wireless personal area networks (WPANs) such as ZigBee.

At block 320, and as will be more fully discussed in specific context below, the auxiliary device 200 may determine a usage context. The usage context may be based on a variety of parameters including the device 200 battery status, docking status, connection method, a device 200 motion sensor activity, and range to a primary computing device 110. For example, based on the docking status and the connection method, it may be determined that the remote is located in a docking station next to the primary device 11O, resulting in a "locally docked" usage context.

At block 330, the primary computing device 110 may communicate displayable information to the auxiliary computing device 200 based on the usage context. Alternatively, the auxiliary computing device 200 may push information the primary computing device 110.

At block 340, the auxiliary device 200 may display the information on the auxiliary computing device display 210. For example, the information may be contextual such that the auxiliary computing device 200 may only display information that may be helpful within the determined usage context.

Further, an operating system may have an auxiliary service that may manage application information on a host PC. Sideshow for Windows Vista may be an example. The auxiliary service may have the ability to send data to Plug and Play (PnP) enumerated auxiliary computing devices based on the device type. In particular, the operating system auxiliary service may have auxiliary or "gadget" applications running on the operating system auxiliary service that may provide information to an auxiliary device display according to the enumerated device status and usage context.

Figure 4:
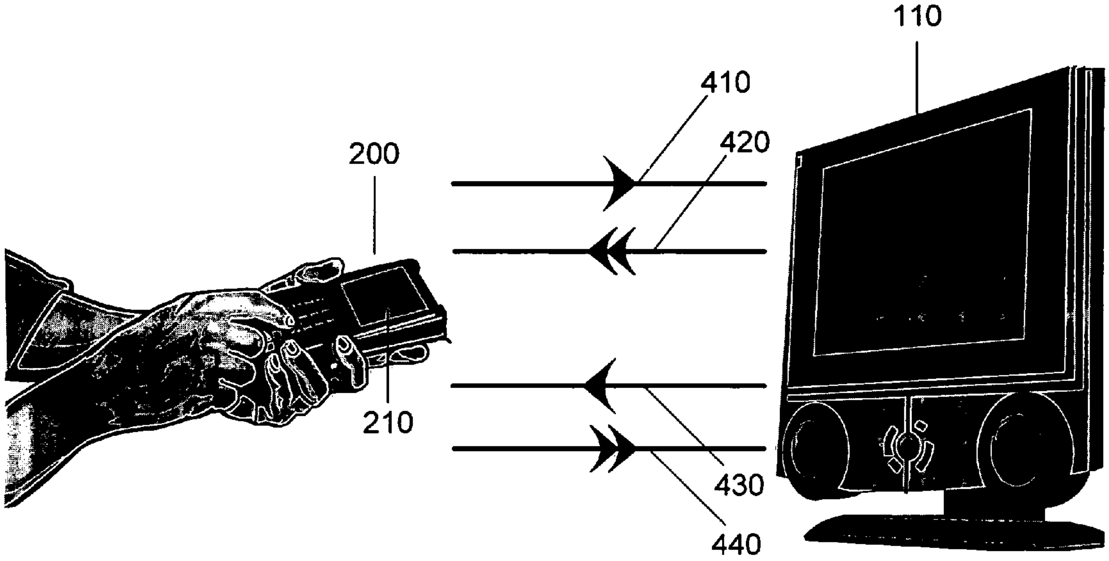
FIG. 4 is an illustration of an auxiliary computing device during a usage context.
Figure 5:
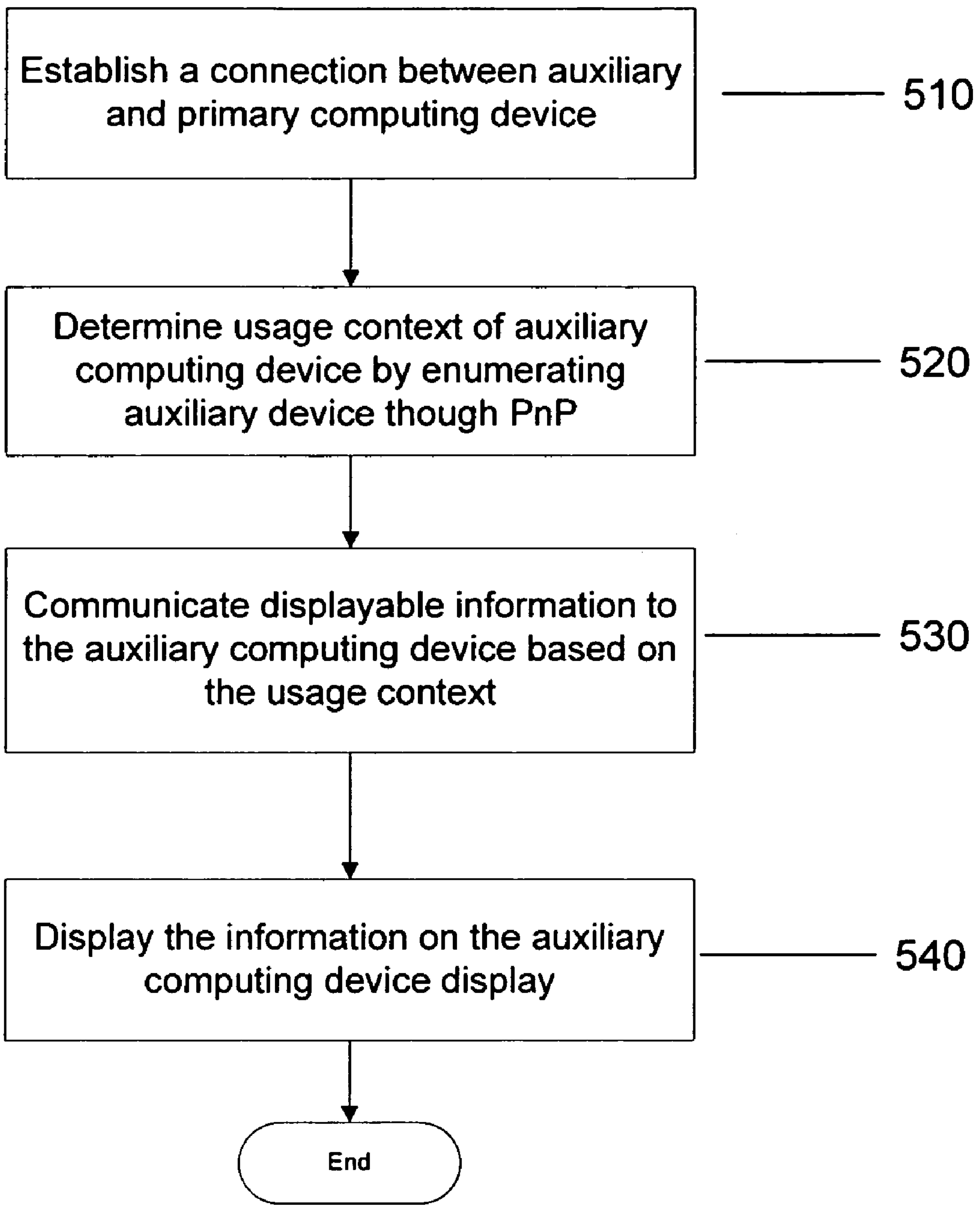
FIG. 5 is a flowchart of a control process for an auxiliary computing device based on usage context.

With reference to FIGS. 4 and 5, a handheld computing device in the form of a remote control 200 may be able to retrieve or display different information transmitted from a home computer system 110 based on the remote control's 200 present usage context. For example, at block 510, a remote control may send a connect signal 410 to the PC 110 via a wireless communication medium. While within sight of the computer 110, the remote device 200 may be running on battery power and the device 200 may be most useful as a traditional remote control to send particular commands to the PC 110. At block 520, the device may establish an enumeration type or usage context by enumerating itself through PnP as a "remote control display." At block 530, the enumeration type or usage context of block 520 may instruct the auxiliary service to send the appropriate data 420 to the display 210 on the remote control 200 to acknowledge the connection and enumeration. At block 540, the auxiliary service may send a signal 430 to the device 200 to render a corresponding remote control user interface (UI) on the remote control display 210. Accordingly, the device 200 may provide feedback 440 to the auxiliary service running on the PC 110 to indicate that the device is receiving signals from the PC 110 or to issue commands. The device 200 and the computer 110 may send various signals between them when the device is in a "remote control display" context.

Figure 6:
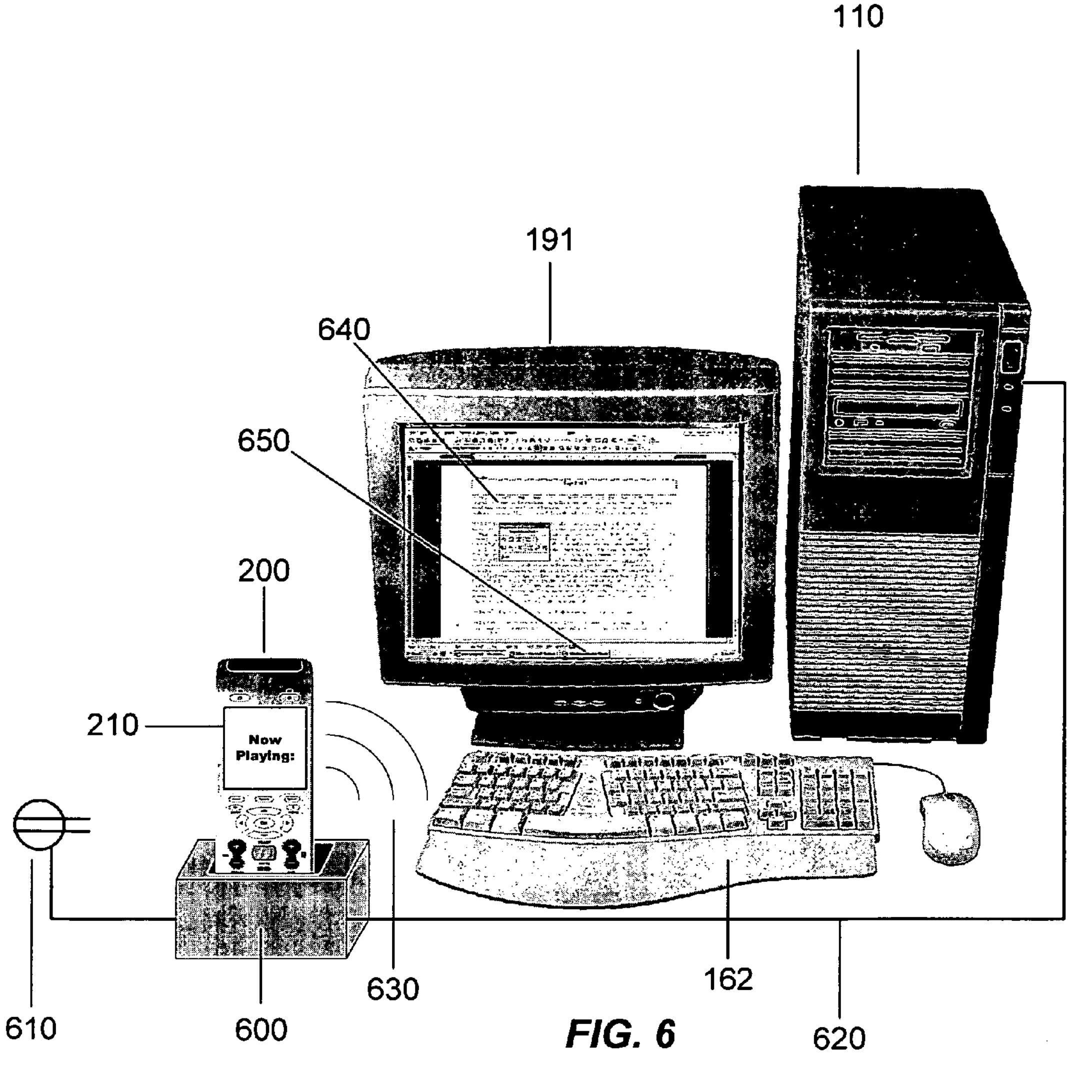
FIG. 6 is an illustration of an auxiliary computing device during a usage context.
Figure 7:
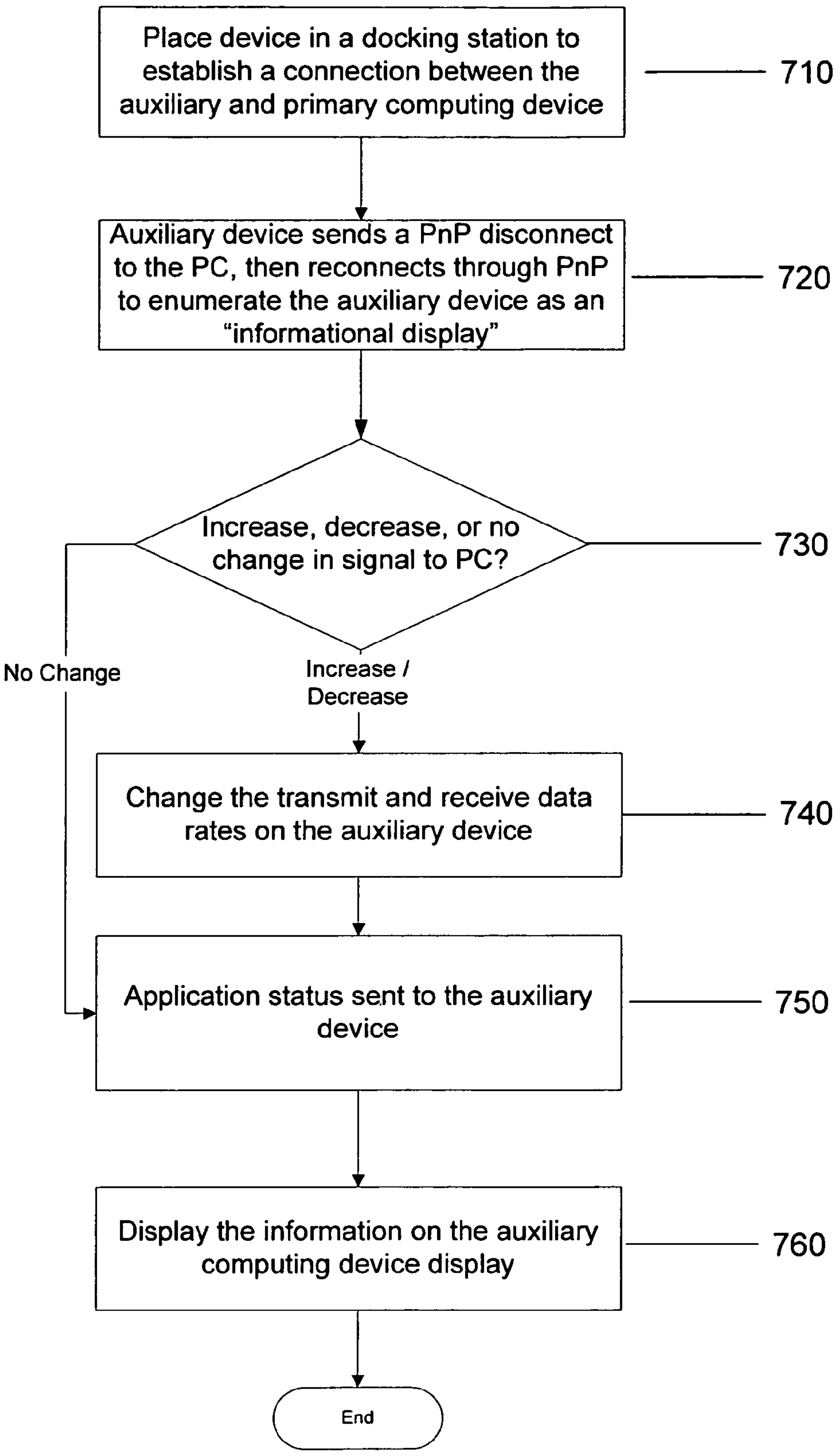
FIG. 7 is a flowchart of a control process for an auxiliary computing device based on usage context.

With reference to FIGS. 6 and 7, the device 200 may behave differently in another context. When a user is present at the PC 110 keyboard 162, at block 710, the user may place the remote control 200 in a docking station 600 which may recharge the controller's internal batteries, may provide power to the device through a wall outlet 610, and may communicate with the primary computing device through a direct connection 620 or through a wireless link 630. At block 720, in response to the docking event, the remote may determine a new usage context and initiate a new power management profile such that the screen on the remote control 210 may be constantly illuminated rather than darkened for battery power conservation. The docking event may also be described as a usage context change for the remote. When the device is docked, it may be most useful as an auxiliary display for the PC. The remote control 200 may send a PnP disconnect to the PC, and then reconnect through PnP enumerating itself as an "informational display" rather than a "remote control display." At block 730, in response to particularly high or low bandwidth communication, the remote may increase or decrease its communication signal to the PC 110, and at block 740, change the transmit and receive data rates of the auxiliary device to enhance the information available to the user from the remote control display 210. At block 750, changing to an "informational display" usage context may enable the auxiliary service engine to send the appropriate data to the remote control display. At block 760, the remote control may be able to display new email notifications, or other auxiliary service gadget information such as a media player (for instance, Windows Media Player) play status or information from a monitoring service application that gathers status information from other computing devices. For example, a computing device imbedded in a kitchen oven may send the monitoring service application information about the oven's temperature, remaining baking time, or other information. Further, a computing device imbedded in a refrigerator may send the monitoring service information concerning the refrigerator's contents. The monitoring service application may then consolidate the information sent from all devices imbedded with a computing device and registered with the application. The monitoring service application may then send the consolidated information to the auxiliary computing device 200, and the device 200 may display the information from the monitoring service application.

Figure 8:
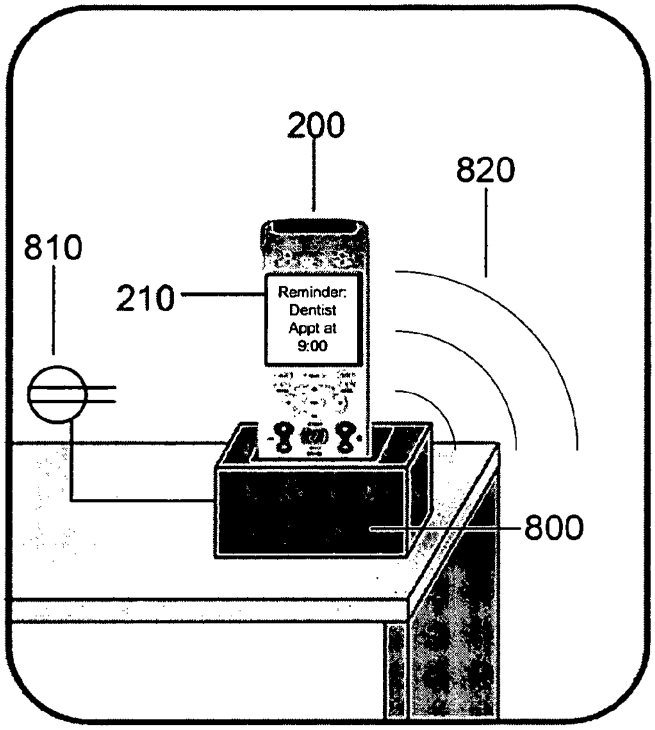
FIG. 8 is an illustration of an auxiliary computing device during a usage context.
Figure 9:
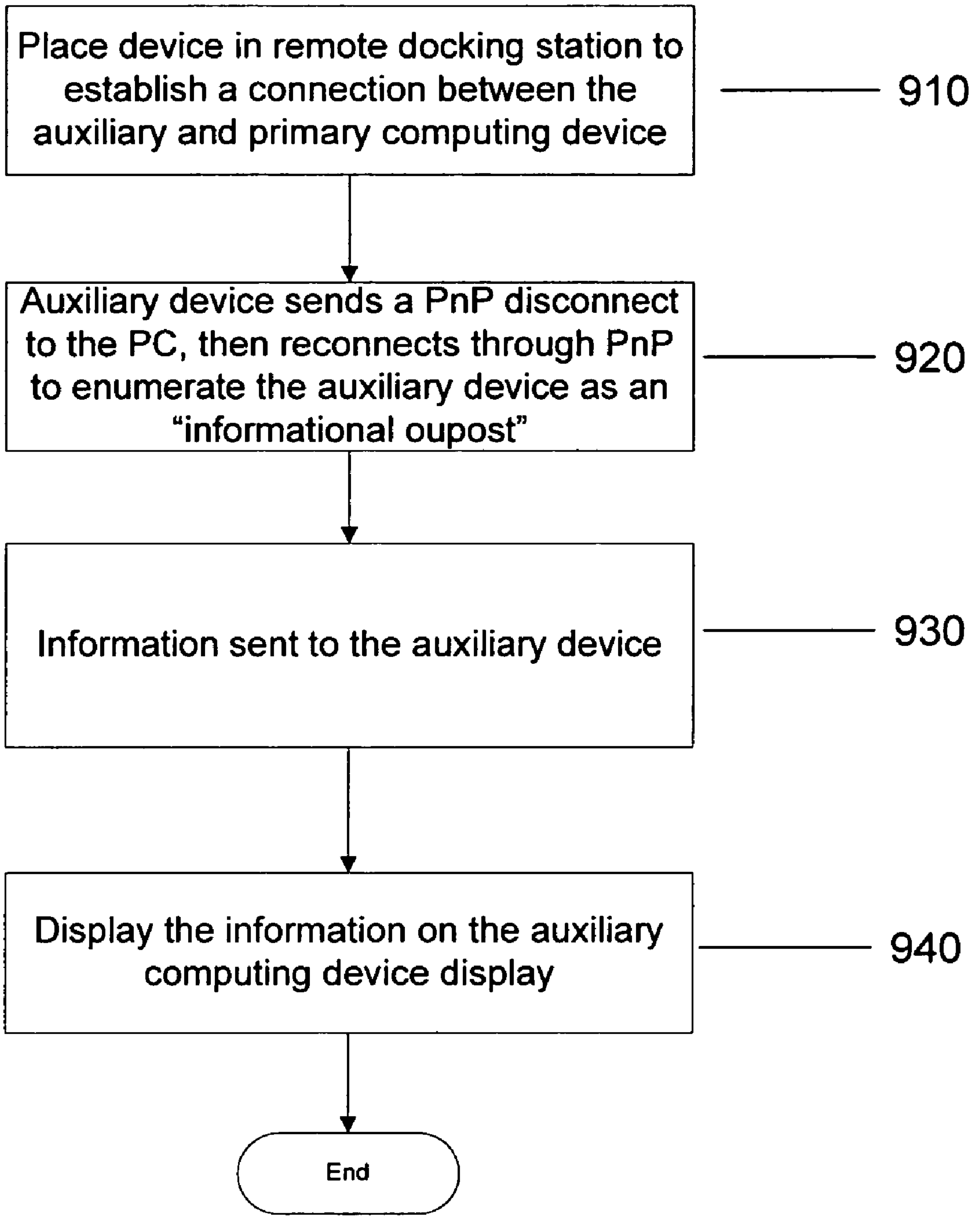
FIG. 9 is a flowchart of a control process for an auxiliary computing device based on usage context.

For use with a media player such as Windows Media Player, the user may be present at her PC 110 and the PC 110 may be showing a document 640 within a word processing application. While the user edits her document 640, she may decide that she wants to listen to music at the same time. She may start the media player, select her music, press the "play" button and minimize the Media Player 650. Once minimized, at block 750, the status of her music (which track, how long, album information, etc.) may be sent to the-remote control 200 and then, at block 760, displayed With reference to FIGS. 8 and 9, the remote control may use another recharging dock 800 in a distant room not in view of the primary computing device display 191. In this context, at block 910, the remote control 200 may be placed in a distant recharging dock 800 so that it may be connected to a wall outlet 810 to recharge its internal batteries and the remote 200 to communicate with the distant PC 110. At block 920, in response to the docking event, the remote may determine a new usage context and initiate a new power management profile such that the screen on the remote control 210 may be selectively illuminated rather than darkened for battery power conservation. When the device is placed in a distant recharging dock 800, it may be most useful an "information outpost" for the PC. The remote control 200 may send a PnP disconnect to the PC, and then reconnect through PnP enumerating itself as an "information outpost" to change its usage context. At block 930, this context change may enable the auxiliary service engine to send the appropriate data to the remote control display. At block 940, the remote control may be able to display new email notifications, or the remote 200 may be used as an alarm clock, which could operate according to a calendar application such as Windows Calendar and could further incorporate music stored on the primary computing device. Further, when the user picks up the remote control 200, or otherwise activates the remote while in a distant room away from the PC, the undocking or other event may cause the remote control 200 to display other information such as a Really Simple Syndication (RSS) feed of pictures from a friend's website, emails received during the night, or the morning headlines.

Figure 10:
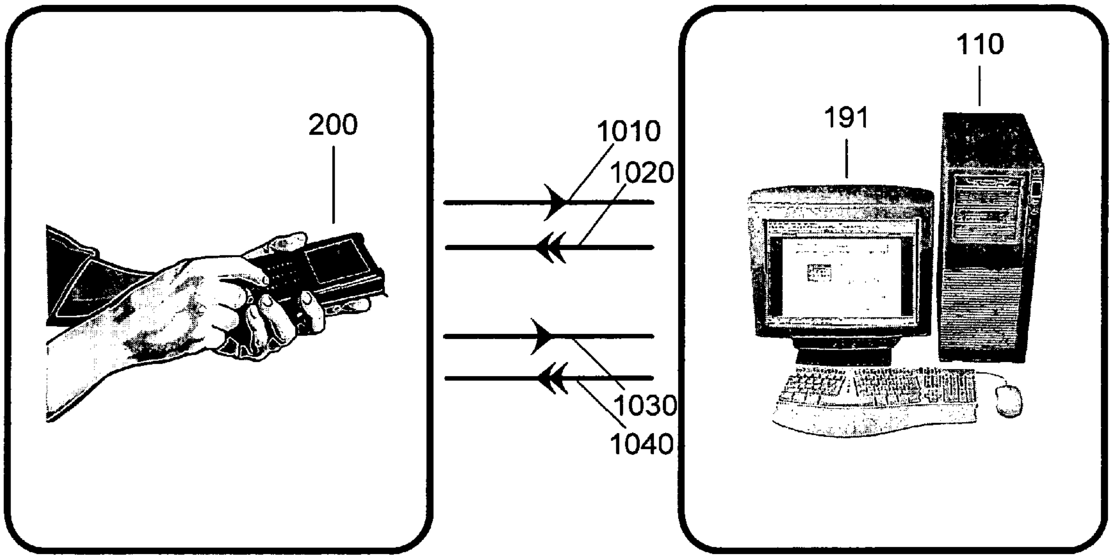
FIG. 10 is an illustration of an auxiliary computing device during a usage context.
Figure 11:
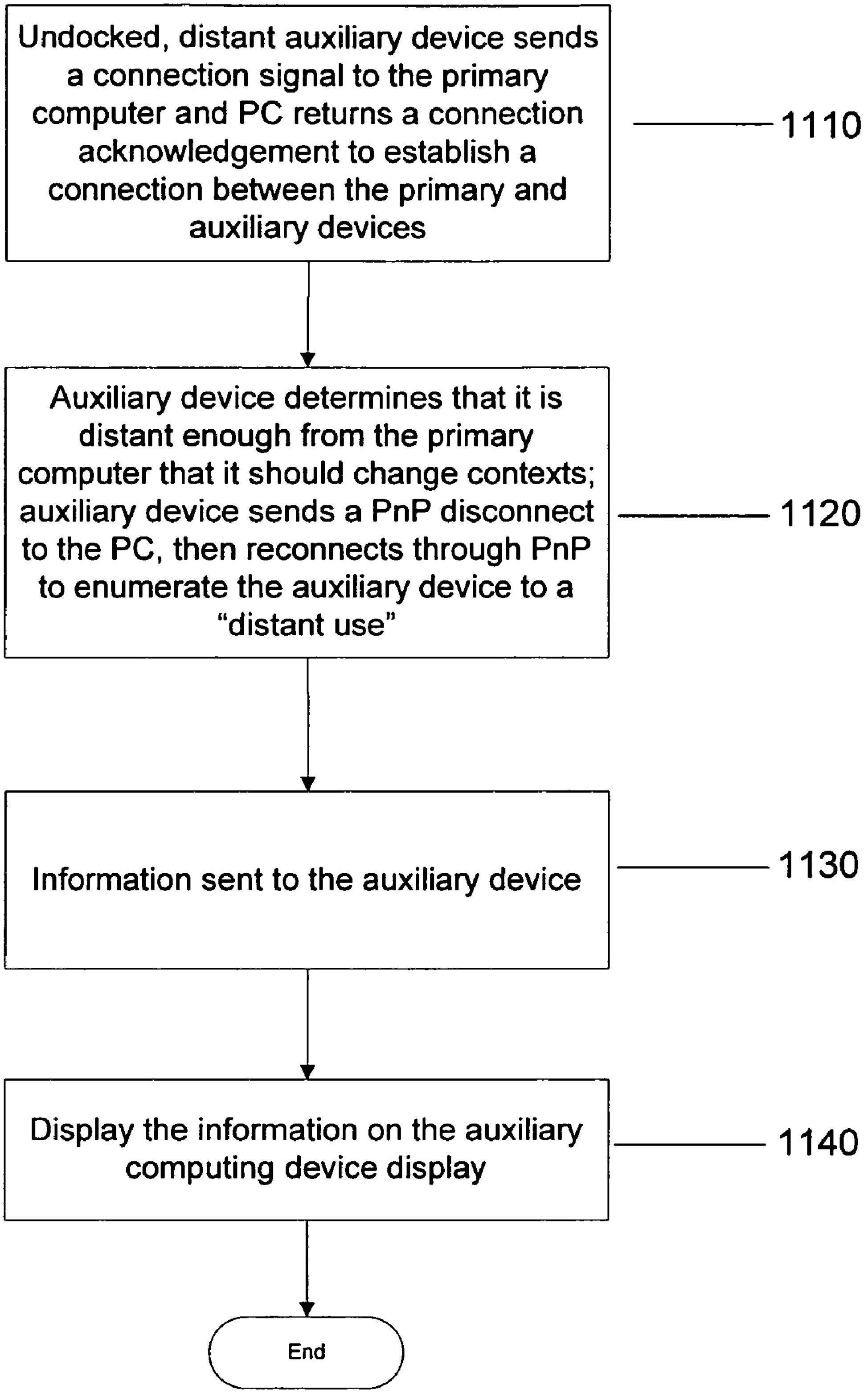
FIG. 11 is a flowchart of a control process for an auxiliary computing device based on usage context.

With reference to FIGS. 10 and 11, the remote control 200 may change usage context when it is undocked and at a distance from the host computing device such that it would not be useful as a traditional remote control device. The remote control 200 may be undocked, running on internal batteries, and in wireless communication with the distant PC 110. At block 1110, the remote 200 may wirelessly communicate a PnP connection event 1010 to the distant PC 110. In this context, the remote may be far enough away from the primary computer 110 such that the primary display 191 cannot be easily seen by the user, but still in wireless communication with the primary computing device. The PC 110 may then send an acknowledgement 1020 to the remote 200 to establish the connection. At block 1120, the remote 200 may determine that it is distant enough from the PC 110 that it should change contexts to a "distant use" mode. For example, the remote 200 may determine that the round-trip delay for signals between the primary and auxiliary devices is above a threshold time. The auxiliary device 200 may send a PnP disconnect 1030 to the PC 110, then the PC 110 may enumerate the auxiliary device to a "distant use" and send another acknowledgement 1040 to the remote 200. At block 1130, this context change may enable the auxiliary service engine to send the appropriate data to the remote control display. At block 1140, the remote control may be able to display new email notifications, home network information, streaming video, or other information.

Figure 12:
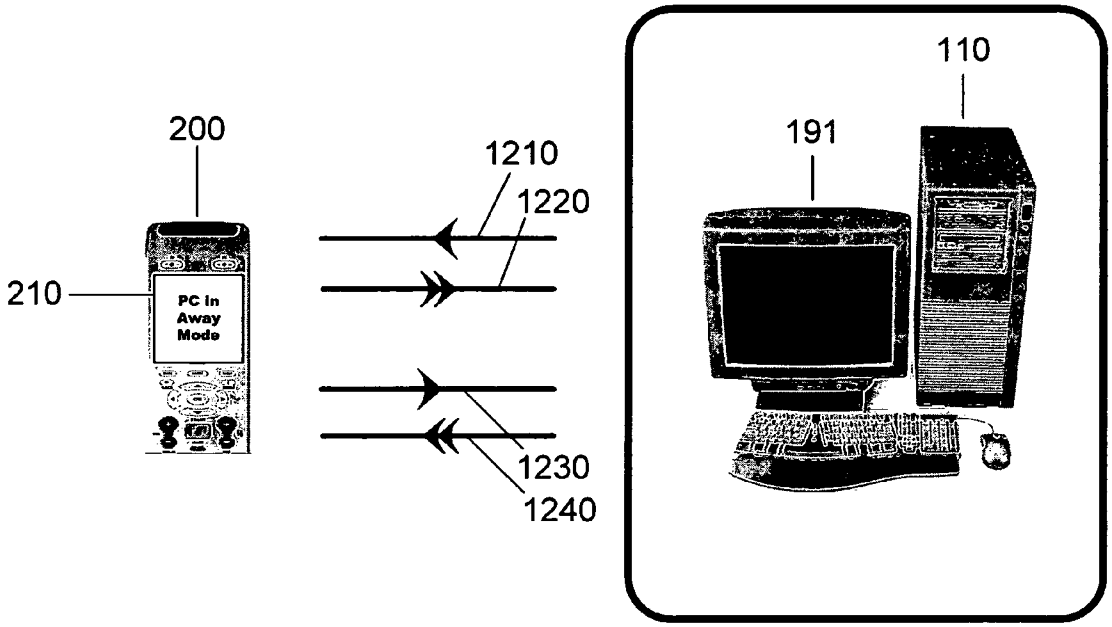
FIG. 12 is an illustration of an auxiliary computing device during a usage context.
Figure 13:
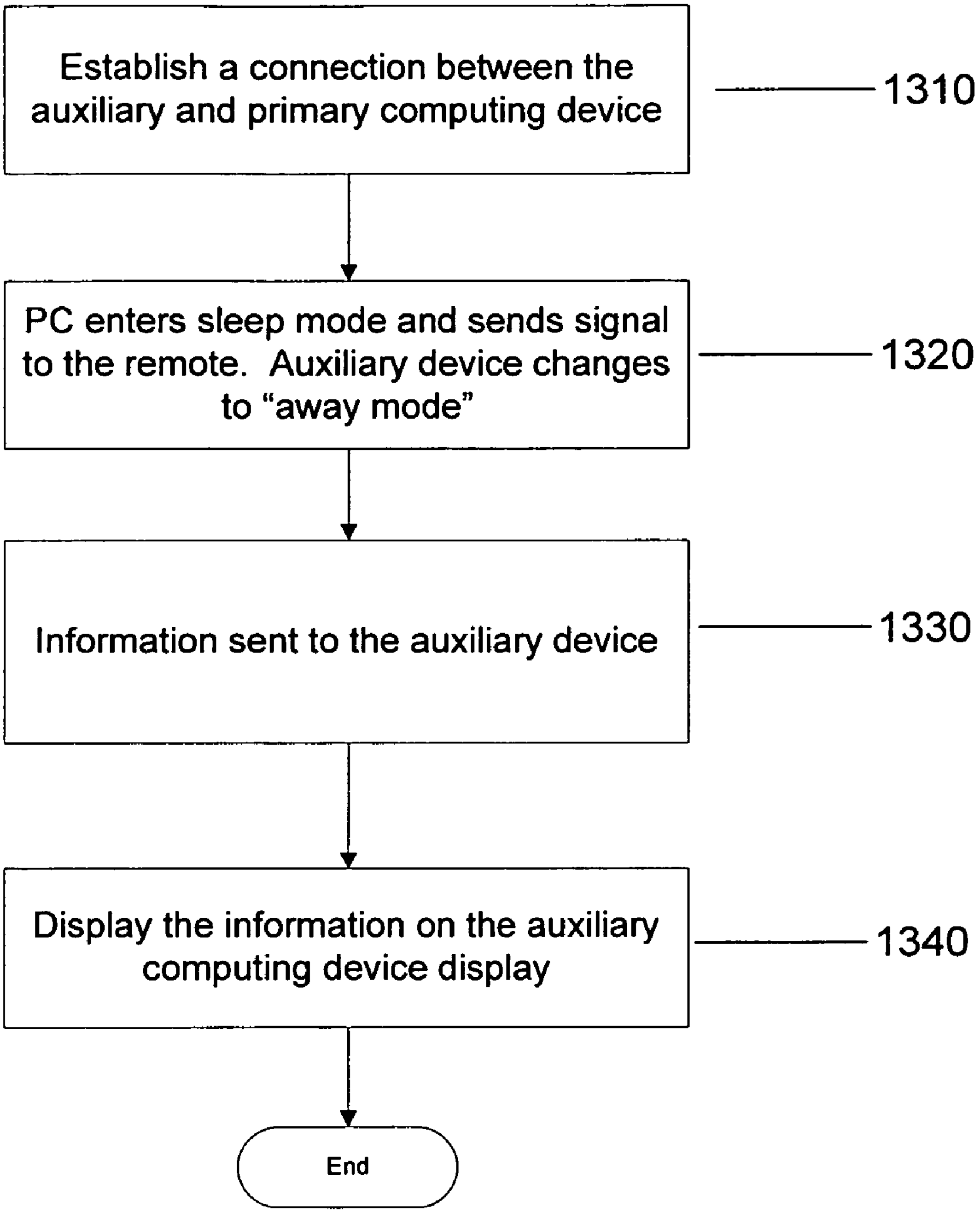
FIG. 13 is a flowchart of a control process for an auxiliary computing device based on usage context.

With reference to FIGS. 12 and 13, the remote control 200 may change usage contexts when the host PC 110 notifies the remote control 200 that it is entering a form of sleep such as Away Mode. As used herein, 'Away Mode' means a state in which the PC is fully running, but appears off to the user by, among other things, turning off the main display. At block 1310, the remote 200 may establish a connection by one of the methods previously discussed. At block 1320, the PC 110 may enter Away Mode and send a related signal 1210 to the remote 200. The remote 200 may then send a PnP disconnect 1220 to the primary device 110, then send a PnP connect 1230 to enumerate the auxiliary device as a "rich display." At block 1330, a user may pull data 1240 to the remote control 200 such as emails, pictures or even streaming video. At block 1340, the remote device display 210 may display the information pulled from the PC 110.

Figure 14:
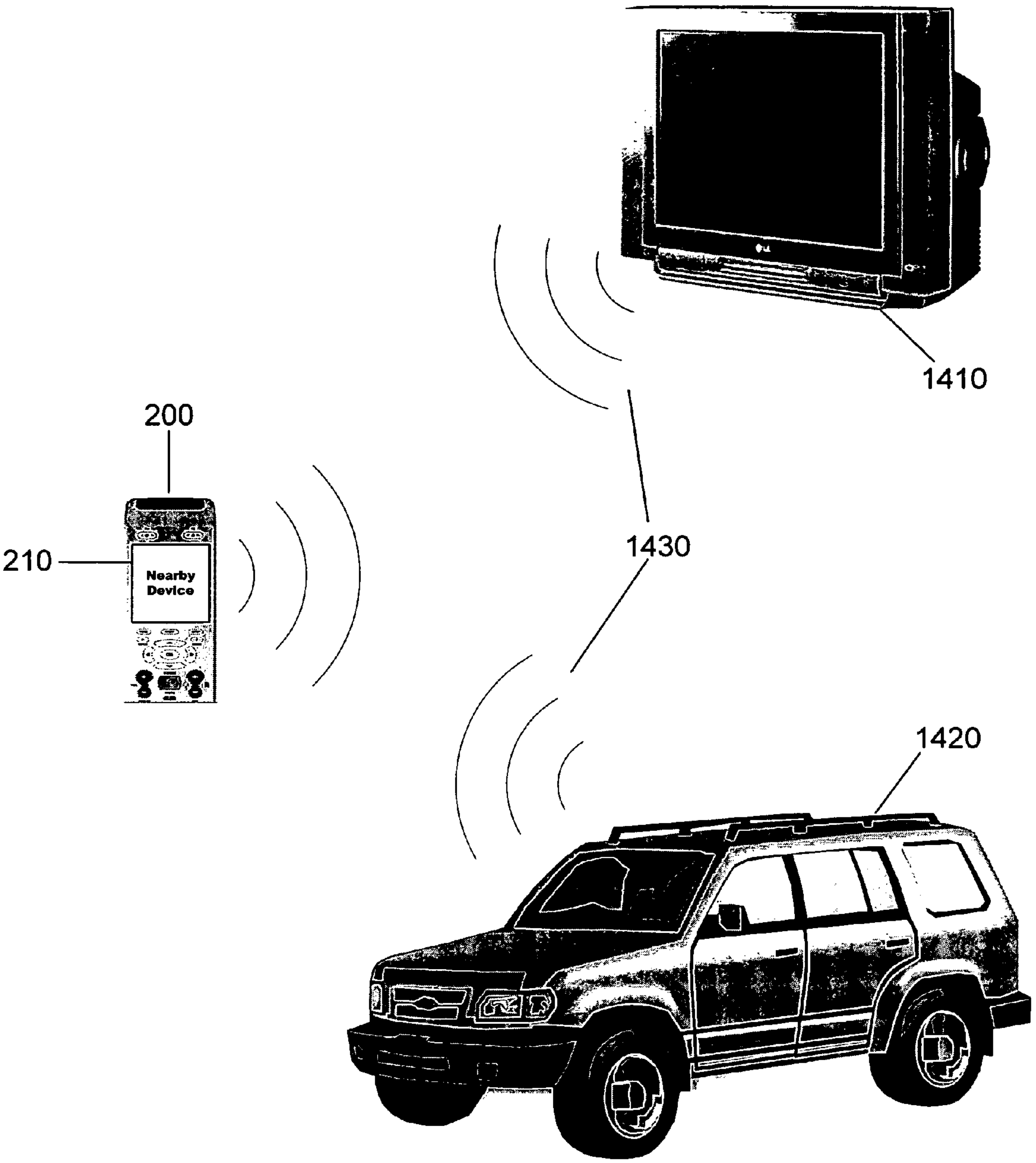
FIG. 14 is an illustration of an auxiliary computing device during a usage context.
Figure 15:
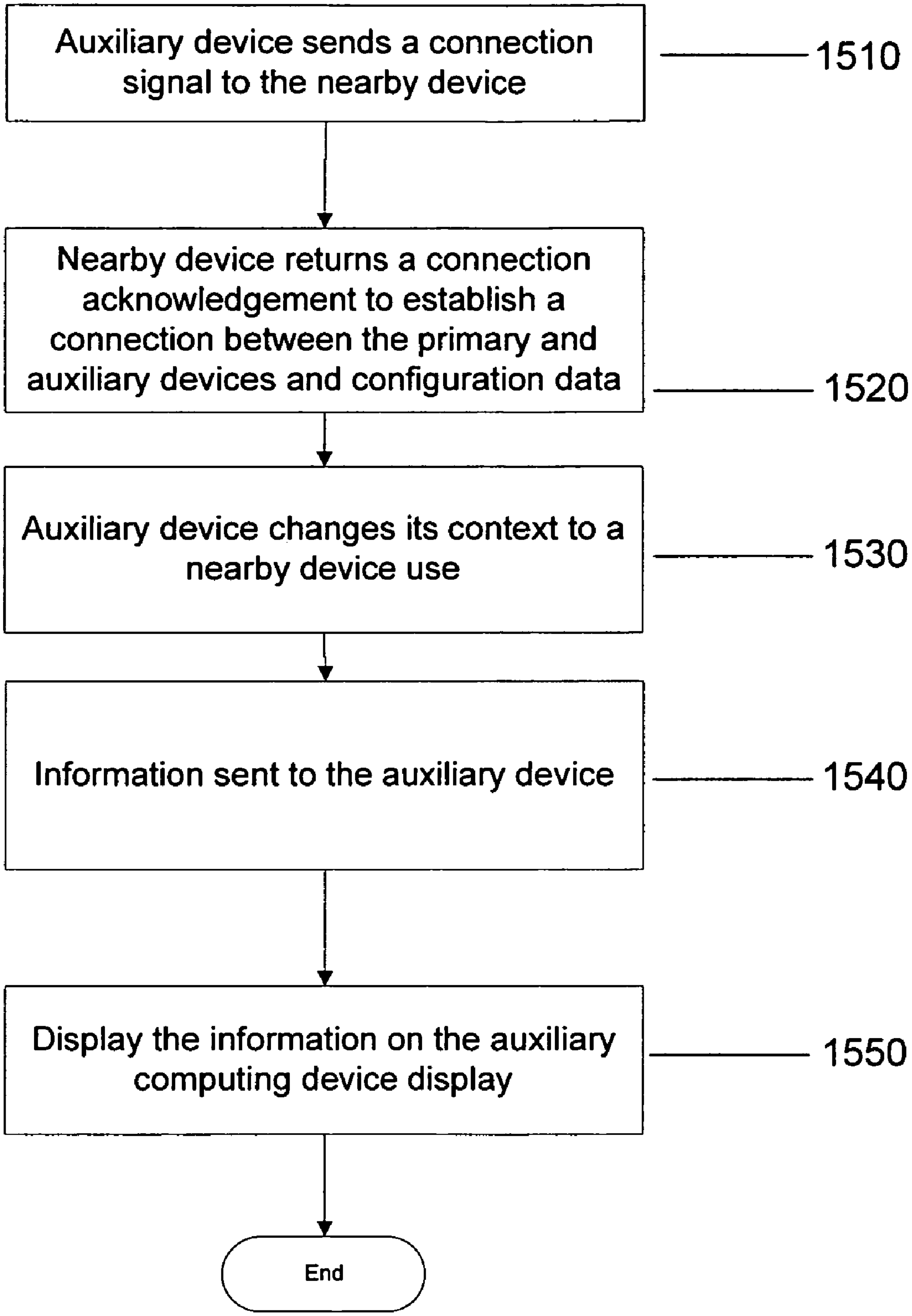
FIG. 15 is a flowchart of a control process for an auxiliary computing device based on usage context.

With reference to FIGS. 14 and 15, the remote control 200 may display information related to what is near it. For example, if the remote 200 is near a simple television 1410, the remote 200 may have a standard television control display 210. If the remote 200 is near a home theater, additional information about the home theater may be displayed. If the remote 200 is in a car 1420, information about the car such as navigation or automobile system component status may be displayed 210. Further, the remote 200 could be incorporated into automobile cell phone systems. Also, as the user moves though daily activities, the remote control display 210 may change in relation to user activities and the corresponding changes in the environment around the remote control 200. In one example, Bluetooth signals 1430 may be communicated to the remote 200 from other devices to change the display on the remote 200. Further, the remote control could be used to control virtually all electronic devices such as lights, computers, games, etc., and the display on the remote 200 may change based on the context of the remote 200 and/or the Bluetooth signals 1430 received by the remote 200.

At block 1510, the remote 200 may establish a connection to a nearby device by one of the methods previously discussed to connect with a PC 110. At block 1520, the nearby device may send a signal 1430 to the remote 200 which includes its device type. The nearby device may also send configuration information which allows the remote 200 to fully interface with the nearby device. For example, the nearby device may send the remote 200 configuration data that enables the remote to control specific features of the nearby device without that data being previously stored on the remote 200. Configuration data may be interface protocols for nearby device subsystems, graphics files for icons, a user's manual, or user interface information. At block 1530, the remote display 210 may change its context to display the nearby device features the remote 200 is capable of controlling. At block 1540, the nearby device may send additional information to the remote 200 including the nearby device status of other information relating to the nearby device including, when close to a television, 1410, a program listing, or when close to an automobile 1420, the auto's fuel status, mileage, service warnings, warranty information, tire life, oil status, and the like. At block 1550, the remote device display 210 may display the information pulled from the nearby device.

Figure 16:
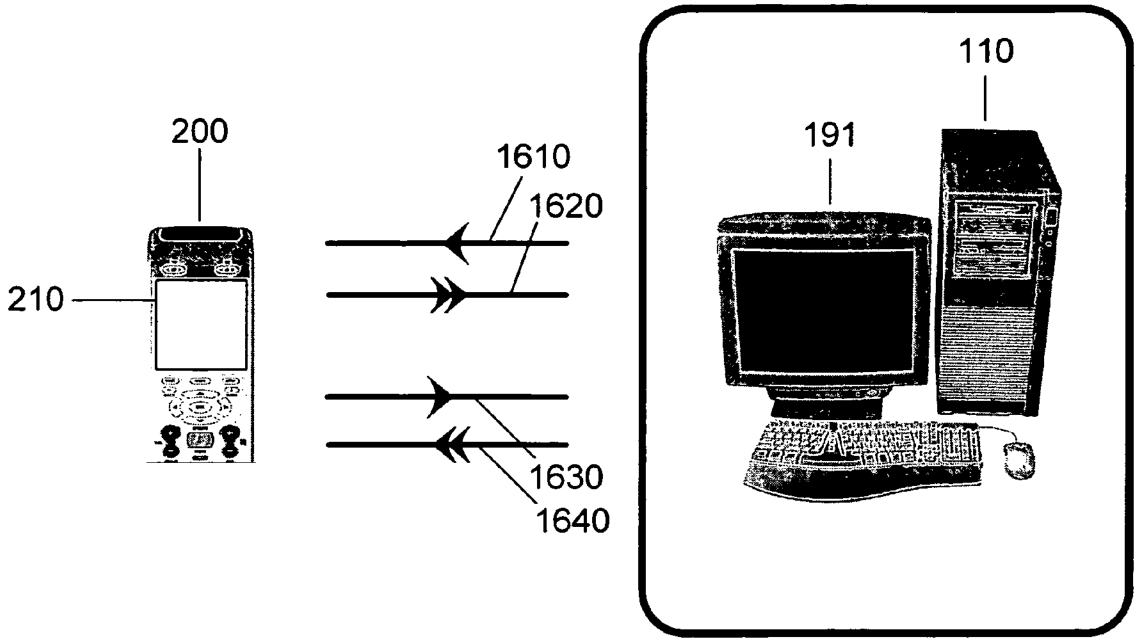
FIG. 16 is an illustration of an auxiliary computing device during a usage context.
Figure 17:
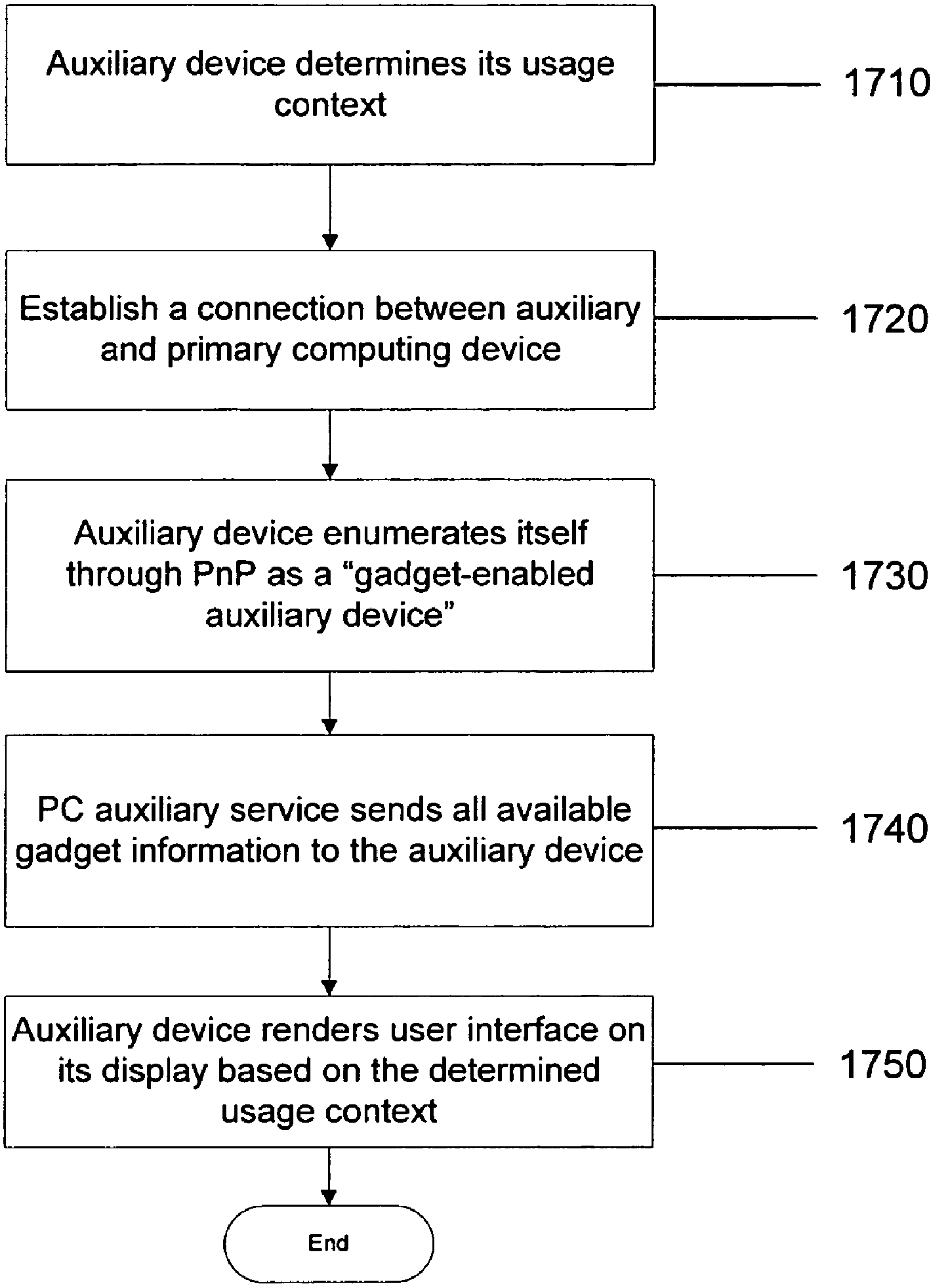
FIG. 17 is a flowchart of a control process for an auxiliary computing device based on usage context.

With reference to FIGS. 16 and 17, the auxiliary device 200 may manage the displayed content rather than relying on the PC 110 to send only data useful for the particular usage context of the device 200. At block 1710, the auxiliary device 200 may determine its usage context based on a docking status, a battery life, a distance from the PC 110, or any of the previously-described parameters. At block 1720, the auxiliary device 200 may establish a connection to a primary computing device 110 using any of the previously-described methods by sending a connect signal 1610 to the PC 110. At block 1730, the device may enumerate itself through PnP merely as a "gadget-enabled auxiliary device." This enumeration may be independent of the usage context of block 1720. At block 1740, the auxiliary service on the PC 110 may send all available gadget information to the auxiliary device 200. At block 1750, the auxiliary device 200 may render an appropriate user interface on the display 210 based on the usage context. The PC 110 auxiliary service may send all available gadget information to the remote, but the remote may only accept and use data that is relevant to its current usage context to render the user interface. The PC 110 auxiliary service may only be aware that a gadget-enabled auxiliary device is connected and to send all gadget data to it; the auxiliary device 200 may disregard data inappropriate for the determined usage context. Rather than allowing the PC auxiliary service to initialize new PnP identifications and new drivers to send different rendering behavior to the display, the firmware on the remote control may manage all content rendered on the display 210. In turn, the PC 110 auxiliary service may not need to be aware of a gadget data endpoint other than the auxiliary device 110 and may send all gadget data to the remote device 200. Allowing the remote device 200 to manage and render all data sent from the PC 110 may eliminate the need to create both a PC 110 driver and remote device 200 driver for each usage context and computing device.

Figure 18A:
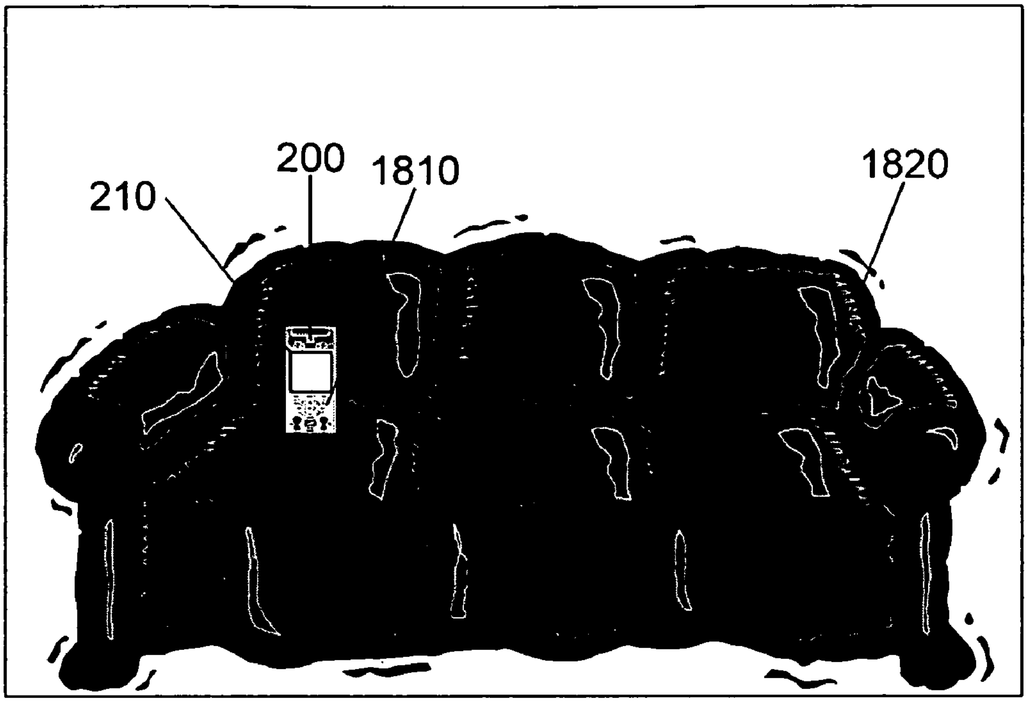
FIG. 18 is an illustration of an auxiliary computing device during a usage context.
Figure 18B:
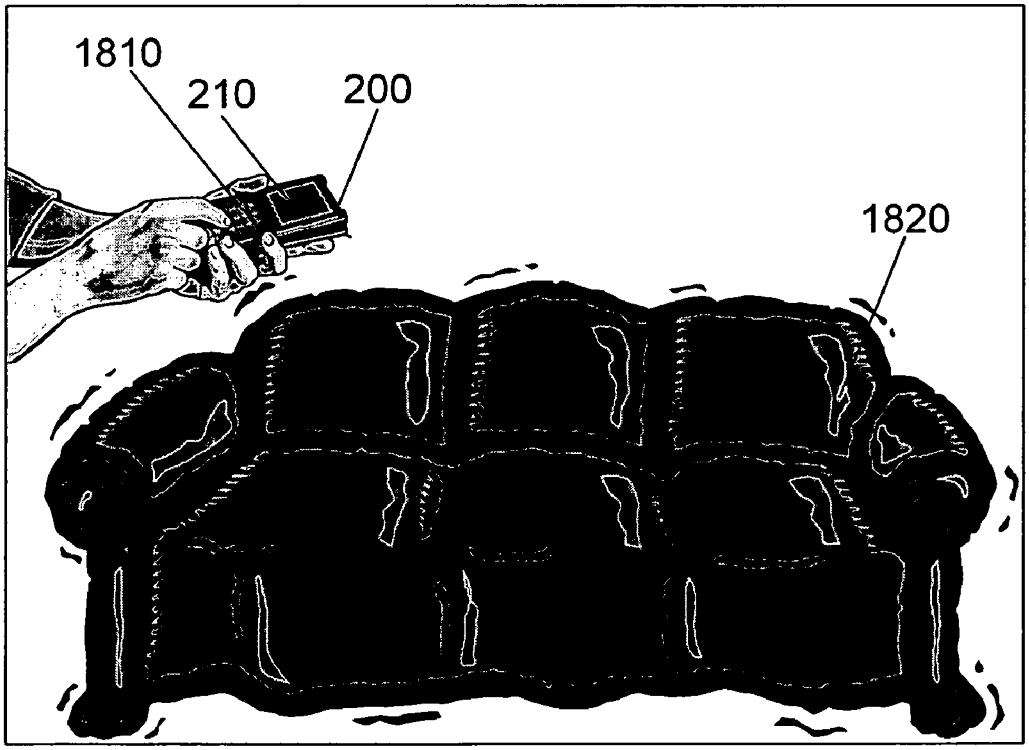
Figure 19:
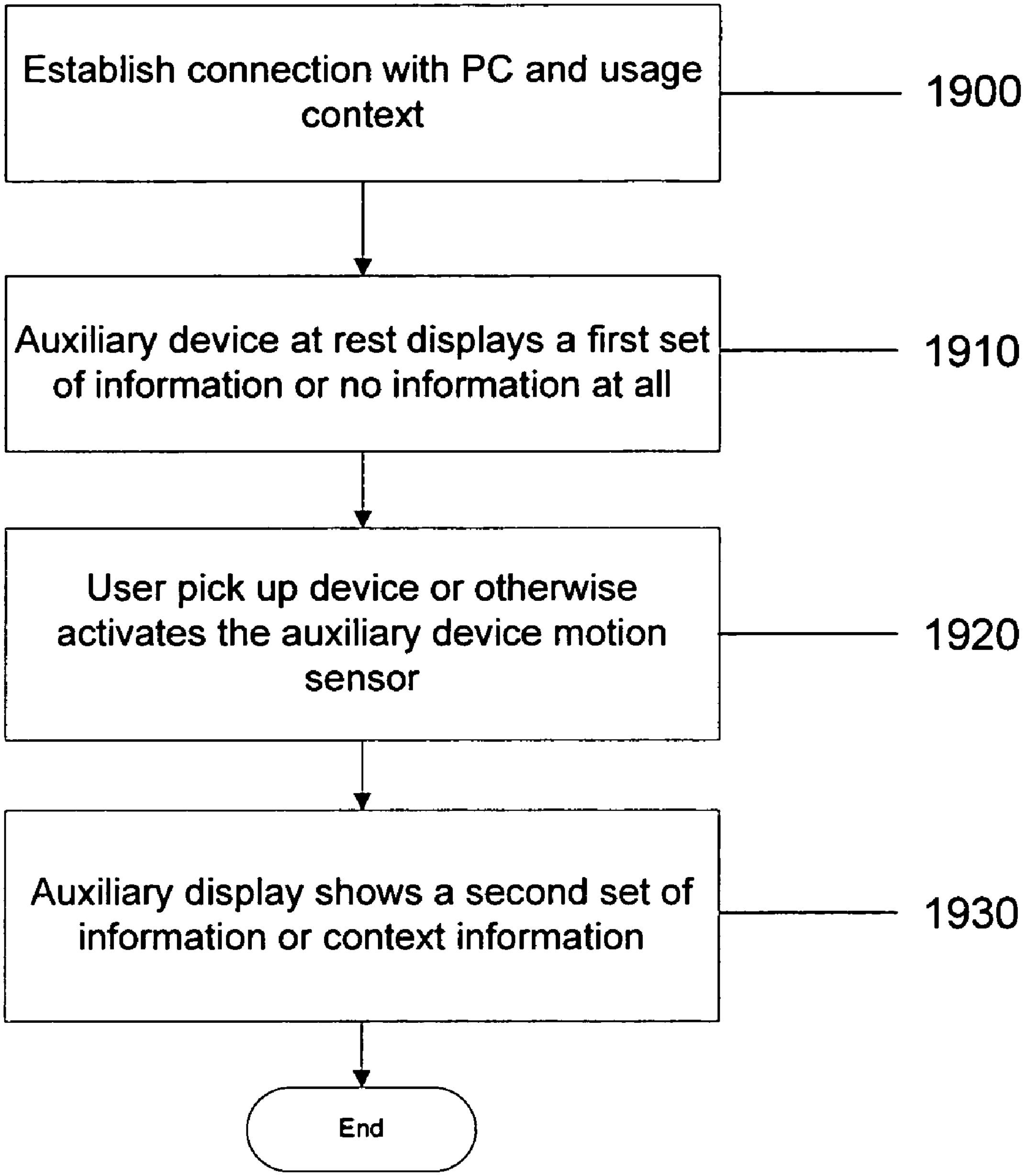
FIG. 19 is a flowchart of a control process for an auxiliary computing device based on usage context.

With reference to FIGS. 18*a*, 18*b*, and 19, the auxiliary computing device may respond change the display 210 based on the status of an internal motion sensor 1810. At block 1900, the device 200 may have already established a connection with a PC 110 as well as established its usage context in accordance with any of the previously described steps. At block 1910, and with further reference to FIG. 18*a*, the auxiliary device 200 may be at rest on another object such as a sofa, couch, settee, or davenport 1820. At rest, the device display 210 may show information such as a reduced set of information, information indicating that the device 200 is at rest, or may have turned off in response to a time out feature. At block 1920, and with further reference to FIG. 18*b*, a user may pick up the device 200, causing the motion sensor 1810 to change status. At block 1930, in response to the motion sensor 1810 status change, the display 210 may show a different set of information, such as that communicated to the device 200 by the PC 110 in the device 200 usage context, or a connection or context status if status changed while the device 200 was at rest.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. On an auxiliary computing device, a method of controlling a user interface comprising:

executing one or more applications and a primary computing device operating system auxiliary service on a primary computing device;

receiving application data from the one or more applications at the auxiliary service;

determining a usage context for an auxiliary computing device from one or more auxiliary computing device parameters comprising a battery status, a docking status, a connection method, a device motion sensor activity, and a distance from the primary computing device;

establishing a connection between the auxiliary computing device and the primary computing device by enumerating the auxiliary computing device through the auxiliary service;

receiving the application data from the operating system auxiliary service at the auxiliary computing device;

determining a subset of the application data based on the usage context; and displaying the subset of the application data on the auxiliary computing device.

2. The method of claim 1, wherein enumerating the auxiliary computing device through the auxiliary service comprises sending a plug and play connect to the auxiliary service.

3. The method of claim 2, further comprising sending a plug and play disconnect to the primary computing device.

4. The method of claim 2, wherein the plug and play connect comprises the usage context.

5. The method of claim 1, wherein the one or more applications provide displayable data to the auxiliary device according to one or more of an enumerated device status or the usage context.

6. The method of claim 5, wherein the displayable data comprises one or more of a media player status, an e-mail notification, an e-mail contents, a streaming video, home network information, a really simple syndication feed, an appointment schedule, an appointment notification, available nearby controllable devices, and nearby controllable device status information.

7. The method of claim 1, wherein the auxiliary computing device comprises one or more of a media device remote control, a hand held computer, a cellular phone, or a Smartphone-enabled device.

8. The method of claim 1, wherein the primary computing device determines the subset of the application data based on the usage context.

9. The method of claim 1, wherein the auxiliary computing device determines the subset of the application data based on the usage context.

10. A computer storage medium comprising computer executable instructions for controlling an auxiliary computing device based on usage context comprising computer executable instructions for:

executing one or more applications and a primary computing device operating system auxiliary service on a primary computing device;

receiving application data from the one or more applications at the auxiliary service;

receiving a first plug and play connect message from the auxiliary computing device at the primary computing device;

establishing a connection between the auxiliary computing device and the primary computing device with the first plug and play connect message by enumerating the auxiliary computing device through the auxiliary service that is in communication with the one or more applications;

determining a first usage context of the auxiliary computing device based on one or more auxiliary computing device parameters comprising a battery status, a docking status, a connection method, a device motion sensor activity, and a distance from the primary computing device;

receiving the first usage context at the primary computing device;

determining a first subset of the application data based on the received first usage context;

receiving the first subset of the application data at the auxiliary service;

displaying the first subset of the application data on the auxiliary computing device;

determining a second usage context of the auxiliary computing device based on a change of the one or more auxiliary computing device parameters;

receiving a plug and play disconnect message from the auxiliary computing device at the primary computing device upon determining the second usage context;

receiving a second plug and play connect message and the second usage context from the auxiliary computing device at the primary computing device after receiving the plug and play disconnect message;

determining a second subset of the application data based on the received second usage context;

receiving the second subset of the application data at the auxiliary service; and displaying the second subset of the application data on the auxiliary computing device;

wherein the first and second subsets of the application data comprise different data and include one or more of a media player status, an e-mail notification, an e-mail contents, a streaming video, home network information, a really simple syndication feed, an appointment schedule, an appointment notification, available nearby controllable devices, or nearby controllable device status information.

11. The computer storage medium of claim 10, wherein the one or more applications provide the displayable data to the auxiliary device according to the usage context.

12. The computer storage medium of claim 11, wherein one or more auxiliary applications executing on the auxiliary service each correspond to an application and provide the displayable data to the auxiliary device in response to the change of the one or more auxiliary computing device parameters.

13. The computer storage medium of claim 12, wherein the change comprises one or more of changing the primary computing device status, changing application information, or changing the application status.

14. The computer storage medium of claim 13, wherein the one or more applications comprise a media player, a photo album, an e-mail program, an instant messenger program, or a monitoring service application.

15. The computer storage medium of claim 14, wherein the monitoring service application sends data from a remote computing device to the auxiliary application.

16. The computer storage medium of claim 10, wherein the auxiliary computing device comprises one or more of a media device remote control, a hand held computer, a cellular phone, or a Smartphone-enabled device.

17. The computer storage medium of claim 10, wherein determining one or more of the first usage context and the second usage context of the auxiliary computing device is performed by the auxiliary computing device.

18. The computer storage medium of claim 10, wherein determining one or more of the first usage context and the second usage context of the auxiliary computing device is performed by the primary computing device.

19. The computer storage medium of claim 10, further comprising the auxiliary computing device selectively rendering the information on the auxiliary computing device display based on the first and second usage context.

* * * * *

UNITED STATES PATENT AND TRADEMARK OFFICE

CERTIFICATE OF CORRECTION

PATENT NO. : 7,523,226 B2
APPLICATION NO. : 11/371660
DATED : April 21, 2009
INVENTOR(S) : Jason M. Anderson et al.

It is certified that error appears in the above-identified patent and that said Letters Patent is hereby corrected as shown below:

In column 4, line 15, delete "typic" and insert -- typically contains data and/or program --, therefor.

In column 7, line 29, after "displayed" insert -- on her remote control display 210. --.

Signed and Sealed this
Third Day of May, 2011

David J. Kappos
*Director of the United States Patent and Trademark Office*